US010586270B2

(12) United States Patent
Reddy et al.

(10) Patent No.: US 10,586,270 B2
(45) Date of Patent: Mar. 10, 2020

(54) NETWORK SITE CART USER INTERFACE HAVING MULTIPLE USER-SPECIFIED CURRENCY FORMATS

(71) Applicant: eBay Inc., San Jose, CA (US)

(72) Inventors: Sailendra Reddy, San Jose, CA (US); Raphael Tsow, San Jose, CA (US); Scott Sharp, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 681 days.

(21) Appl. No.: 15/098,394

(22) Filed: Apr. 14, 2016

(65) Prior Publication Data

US 2017/0301005 A1 Oct. 19, 2017

(51) Int. Cl.
| | | |
|---|---|---|
| G06Q 30/00 | (2012.01) | |
| G06Q 30/06 | (2012.01) | |
| G06Q 20/38 | (2012.01) | |
| G06Q 20/12 | (2012.01) | |

(52) U.S. Cl.
CPC ......... *G06Q 30/0635* (2013.01); *G06Q 20/12* (2013.01); *G06Q 20/381* (2013.01); *G06Q 20/387* (2013.01)

(58) Field of Classification Search
CPC .............. G06Q 30/00; G06Q 30/0601; G06Q 30/0613; G06Q 30/0641
See application file for complete search history.

(56) References Cited

U.S. PATENT DOCUMENTS

| | | | | |
|---|---|---|---|---|
| 7,747,475 B1* | 6/2010 | Bowman | ................ | G06Q 20/04 705/26.1 |
| 8,438,052 B1* | 5/2013 | Chanda | ............. | G06Q 30/0282 705/7.11 |
| 2002/0038255 A1* | 3/2002 | Tarvydas | ............... | G06Q 30/06 705/26.43 |
| 2006/0059099 A1* | 3/2006 | Ronning | ................. | G06F 21/10 705/59 |
| 2009/0138369 A1* | 5/2009 | Raja | ....................... | G06Q 20/10 705/26.1 |
| 2009/0259561 A1* | 10/2009 | Boys | ...................... | G06Q 10/08 705/26.1 |
| 2010/0042515 A1* | 2/2010 | Crespo | .................. | G06Q 30/06 705/26.1 |

(Continued)

OTHER PUBLICATIONS

Vijayaraghavan, Girl, and Cem Kaner. "Bugs in your shopping cart: A Taxonomy." Presented at the International Software Quality Week, San Francisco, CA (2002). Retrieved Jul. 30 2003. (Year: 2002).*

*Primary Examiner* — Christopher B Seibert
(74) *Attorney, Agent, or Firm* — Schwegman Lundberg & Woessner, P.A.

(57) ABSTRACT

The disclosed system and methods adjust one or more parameters affecting the purchase of one or more items and change a buyer interface in order to display the consolidated parameter to a buyer. Example embodiments include a machine-implemented method for detecting an edit to the shopping cart, conducting a complex parameter editing simulation based on data accessed from multiple databases, adjusting a parameter associated with an item in the shopping cart, and adjusting and displaying a cart total to the buyer. The system can further receive an indication to checkout the shopping cart and edit complex parameters during checkout accordingly.

16 Claims, 13 Drawing Sheets

(56) References Cited

U.S. PATENT DOCUMENTS

| | | | | |
|---|---|---|---|---|
| 2010/0185514 | A1* | 7/2010 | Glazer | G06Q 30/0253 |
| | | | | 705/14.51 |
| 2012/0226573 | A1* | 9/2012 | Zakas | G06Q 30/0207 |
| | | | | 705/26.2 |
| 2012/0323682 | A1* | 12/2012 | Shanbhag | G06Q 30/0601 |
| | | | | 705/14.51 |
| 2013/0290172 | A1* | 10/2013 | Mashinsky | G06Q 20/12 |
| | | | | 705/39 |
| 2014/0122203 | A1* | 5/2014 | Johnson | G06Q 30/00 |
| | | | | 705/14.23 |
| 2015/0169624 | A1* | 6/2015 | Gupta | G06F 16/951 |
| | | | | 707/639 |
| 2016/0171540 | A1* | 6/2016 | Mangipudi | G06Q 30/0255 |
| | | | | 705/14.53 |
| 2016/0247148 | A1* | 8/2016 | Jivan | G06Q 20/381 |

* cited by examiner

NETWORK SITE CART USER INTERFACE HAVING MULTIPLE USER-SPECIFIED CURRENCY FORMATS

TECHNICAL FIELD

The subject matter disclosed herein generally relates to the technical field of special-purpose machines that facilitate provision of communications and logic transactions between special-purpose machines and improvements to such variants, and to the technologies by which such special-purpose machines become improved compared to other special-purpose machines that facilitate heterogeneous pricing and payment.

BACKGROUND

Various systems exist that allow buyers to purchase goods online. In many systems, a buyer selects one or more items that he or she wishes to purchase on a user interface. In some systems, an online shopping cart (shopping cart) aggregates the items that are selected and acts as an intermediary between the item selection and the checkout transaction. Typically, one or more parameters influence on the buyer's decision to purchase an item. However, these parameters may be affected by the context in which the buyer is purchasing the item. Further, the buyer may be need to take additional steps to enact or approve of these transactions. The systems, meanwhile, exhaust network resources in order to display each step to the user during the purchase, many of the steps redundant and wasteful.

BRIEF DESCRIPTION OF THE DRAWINGS

Some embodiments are illustrated by way of example and not limitation in the figures of the accompanying drawings.

DETAILED DESCRIPTION

Figure 1:
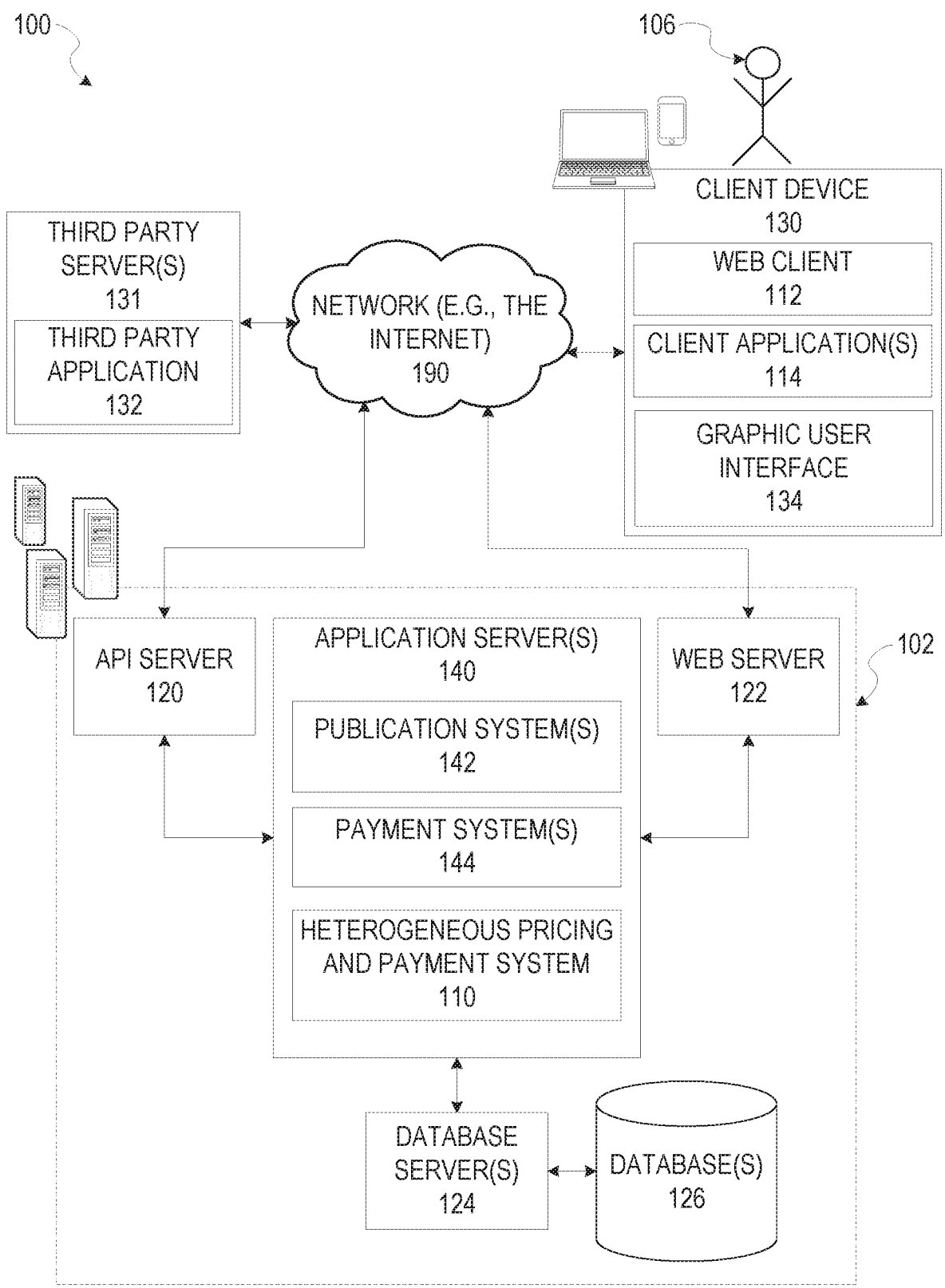
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As used herein, heterogeneous pricing and payment refers to calculating a price and effectuating a payment of at least one item where at least one factor related to a buyer or a seller may cause a difference in the price or payment. A potential advantage the system is that a customer is more likely to complete a transaction if he or she can add items to a shopping cart or complete checkout with little interference caused by additional fees that apply at the checkout stage. In example embodiments, a heterogeneous pricing and payment system detects that a buyer has made an edit to a shopping cart, simulates the checkout process of purchasing all of the items in the shopping cart, including modifying the shopping cart based on a change to a complex parameter, presents the altered shopping cart to the buyer, receives a checkout indication from the buyer to purchase all items in the shopping cart, and performs a checkout of the shopping cart. Further, the checkout of the shopping cart performs similar transactions as simulated before in the shopping cart, such that the buyer sees little discrepancy between any difference in price displayed on the shopping cart and at checkout. Certain parameters, such as shipping method, may not be factored in when first seen in the shopping cart and therefore may first be calculated or viewed by the user at checkout. During the checkout process, multiple factors that would individually each comprise a transaction fee requiring buyer approval, are folded into a single unified transaction that progresses with no need for buyer approval.

The factors, as discussed above, can better be described as complex parameters. A complex parameter is an attribute of a possible transaction of an item that is subject to change based on the context of the possible transaction. A transaction involving an item is considered a possible transaction when the item is added to a shopping cart, but becomes an actual transaction once checkout of the cart is complete.

For example, complex parameters include a currency that is used to purchase the item, a level of discount that applies to the item, or a sales tax applied to the item. Certain complex parameters may be more static, such as shipping cost, which may be a flat fee that only occurs at checkout. Modifying the shopping cart based on a change to a complex parameter may include modifying the shopping cart to reflect a current exchange rate for an item where the buyer prefers to pay in a first currency and a seller prefers to pay in a second currency. Since many complex parameters, such as currency, can be affected by changes occurring outside of the context of the transaction (e.g., a change in currency rates), in an example embodiment each possible transaction in the shopping cart that has a complex parameter is recalculated every time the shopping cart is edited.

Since the checkout is simulated, the machine does not need to expend network resources on any virtual display. Rather, any changes to the shopping cart based on changes to the complex parameters occurs entirely on the computer logic level. A virtual display can be generated only after the simulation of edits to complex parameters is complete. Thus, instead of generating a virtual display for each and every transaction, the machine can generate a single virtual display for one universal transaction based on the simulation that includes a grand total.

In some example embodiments, complex parameters may be not be calculated or displayed to the buyer until checkout. In further example embodiments, the display presents subtotals in differentiated currencies and show the grand total that is rendered after currency conversions. Alternatively, the currency fee and conversation calculation can be presented to the buyer only after the buyer proceeds to checkout.

In other example embodiments, complex parameters may be differently edited or not edited at all at checkout. For example, if a buyer changes the payment method at checkout, certain complex parameters previously simulated may no longer affect the transaction or affect the transaction differently. In a case where the payment method at checkout differs from the payment method relied on in simulation, edits to complex parameters related to currency, discount, and others may no longer apply or apply differently.

With reference to FIG. 1, an example embodiment of a high-level client-server-based network architecture 100 is shown. A network-based system 102, in the example forms of a network-based marketplace or parameter system, provides server-side functionality via a network 190 (e.g., the Internet or wide area network (WAN)) to one or more client devices 130 FIG. 1 illustrates, for example, a web client 112 (e.g., a browser, such as the Internet Explorer® browser developed by Microsoft® Corporation of Redmond, Wash. State), client application(s) 114, and a graphic user interface 134 executing on client device 130.

The client device 130 may comprise, but are not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may utilize to access the network-based system 102. In some embodiments, the client device 130 may comprise a display module (not shown) to display information (e.g., in the form of user interfaces). In further embodiments, the client device 130 may comprise one or more of a touch screens, accelerometers, gyroscopes, cameras, microphones, global positioning system (GPS) devices, and so forth. The client device 130 may be a device of a user that is used to perform a transaction involving digital items within the network-based system 102. In one embodiment, the network-based system 102 is a network-based marketplace that responds to requests for product listings, publishes publications comprising item listings of products available on the network-based marketplace, and manages parameters for these marketplace transactions. One or more users 106 may be a person, a machine, or other means of interacting with client device 130. In embodiments, the user 106 is not part of the network architecture 100, but may interact with the network architecture 100 via client device 130 or another means. For example, one or more portions of network 190 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 130 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 130, then this application is configured to locally provide the user interface and at least some of the functionalities with the application configured to communicate with the network-based system 102, on an as needed basis, for data and/or processing capabilities not locally available (e.g., access to a database of items available for sale, to authenticate a user, to verify a method of parameter, etc.). Conversely if the e-commerce site application is not included in the client device 130, the client device 130 may use its web browser to access the e-commerce site (or a variant thereof) hosted on the network-based system 102.

One or more users 106 may be a person, a machine, or other means of interacting with the client device 130. In example embodiments, the user 106 is not part of the network architecture 100, but may interact with the network architecture 100 via the client device 130 or other means. For instance, the user provides input (e.g., touch screen input or alphanumeric input) to the client device 130 and the input is communicated to the network-based system 102 via the network 190. In this instance, the network-based system 102, in response to receiving the input from the user, communicates information to the client device 130 via the network 190 to be presented to the user. In this way, the user can interact with the network-based system 102 using the client device 130.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the database(s) 126 are storage devices that store information to be posted (e.g., publications or listings) to the publication system 120. The database (s) 126 may also store digital item information in accordance with example embodiments.

Additionally, a third party application 132, executing on third party server(s) 131, is shown as having programmatic access to the network-based system 102 via the programmatic interface provided by the API server 120. For example, the third party application 132, utilizing information retrieved from the network-based system 102, supports one or more features or functions on a website hosted by the third party. The third party website, for example, provides one or more promotional, marketplace, or parameter functions that are supported by the relevant applications of the network-based system 102.

The publication systems 142 may provide a number of publication functions and services to users 106 that access the network-based system 102. The parameter systems 144 may likewise provide a number of functions to perform or facilitate parameters and transactions. While the publication system 142 and parameter system 144 are shown in FIG. 1 to both form part of the network-based system 102, it will be appreciated that, in alternative embodiments, each system 142 and 144 may form part of a parameter service that is separate and distinct from the network-based system 102. In some embodiments, the parameter systems 144 may form part of the publication system 142.

The heterogeneous pricing and payment system 110 may provide functionality to reduce the steps experienced by the buyer during checkout by performing a simulation of editing complex parameters every time a buyer edits items in the shopping cart and changing a graphic user interface (GUI) to present new order information. To the buyer, the change in the GUI appears to occur in response to the buyer editing the shopping cart, but the change is actually in response to the results of the complex parameter editing simulation automatically behind-the-scenes. The heterogeneous pricing and payment system 110 may perform various machine-based operations during the complex parameter editing simulation, including, but not limited to, a currency calculation and a discount calculation. These calculations comprise simulations of the actual transactions that will take place when the buyer places the order. The results of these calculations are presented to the buyer as a consolidated new price (modified price) for the item. Once the buyer progresses to checkout and enters a payment method, the heterogeneous pricing and payment system 110 further performs a checkout sequence where complex parameters are edited rather than simulated.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, parameter system(s) 144, and heterogeneous pricing and payment system 110 could also be implemented as stand-alone software programs, which do not necessarily have networking capabilities.

The web client 112 may access the various publication and parameter systems 142 and 144 via the web interface supported by the web server 122. Similarly, the virtual payment consolidation system 110 accesses the various services and functions provided by the publication and payment systems 142 and 144 via the programmatic interface provided by the API server 120.

Figure 2:
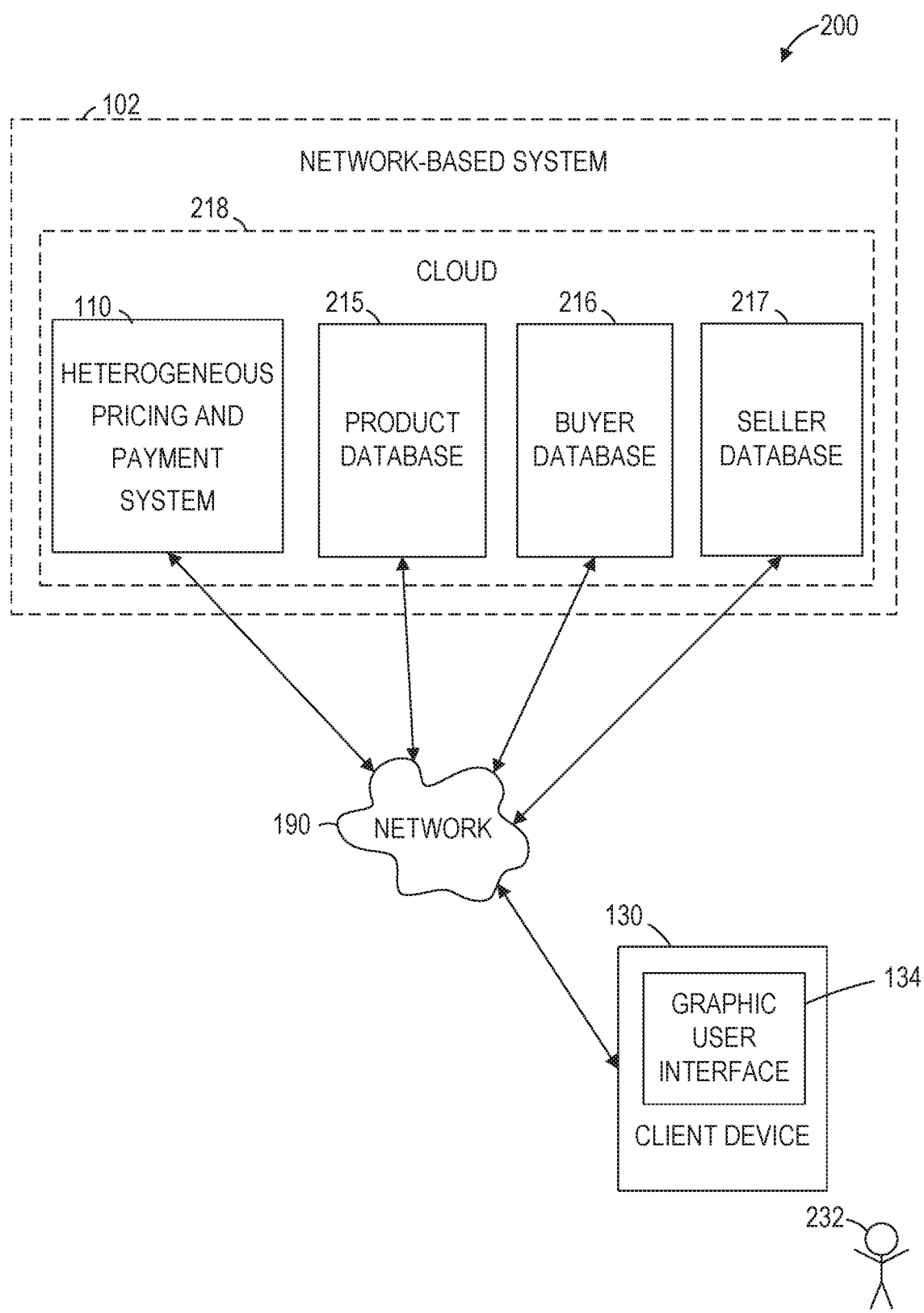
FIG. 2 is a network diagram illustrating a network environment suitable for the heterogeneous pricing and payment system, according to some example embodiments.

FIG. 2 is an alternate network diagram illustrating a network environment 200 suitable for heterogeneous pricing and payment, according to some example embodiments. The network environment 200 includes the heterogeneous pricing and payment system 110, a product database 215, a buyer database 216, and a seller database 217 all communicatively coupled to each other via a network 190. The heterogeneous pricing and payment system 110, with or without the product database 215, buyer database 216, and seller database 217, may form all or part of a cloud 218 (e.g., a geographically distributed set of multiple machines configured to function as a single server), which may form all or part of a network-based system 102 (e.g., a cloud-based server system configured to provide one or more network-based services to the client devices 130). The heterogeneous pricing and payment system 110 and the client device 130 may be implemented in a special-purpose (e.g., specialized) computer system, in whole or in part, as described below with respect to FIG. 9.

Also shown in FIG. 2 is buyer 232. Buyer 232 may be a human user (e.g., a human being), a machine user (e.g., a computer configured by a software program to interact with the client device 130), or any suitable combination thereof (e.g., a human assisted by a machine or a machine supervised by a human). The buyer 232 is associated with the client device 130 and may be a user of the client device 130. For example, the client device 130 may be a desktop computer, a vehicle computer, a tablet computer, a navigational device, a portable media device, a smart phone, or a wearable device (e.g., a smart watch, smart glasses, smart clothing, or smart jewelry) belonging to the buyer 232. The client device 130 may further include a user interface such as a graphic user interface 134 which may display information to the buyer 232.

Any of the systems or machines (e.g., databases and devices) shown in FIG. 1 may be, include, or otherwise be implemented in a special-purpose specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 13, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single machine, and the functions described herein for any single system or machine may be subdivided among multiple systems or machines.

The network 190 may be any network that enables communication between or among systems, machines, databases, and devices (e.g., between the heterogeneous pricing and payment system 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 3:
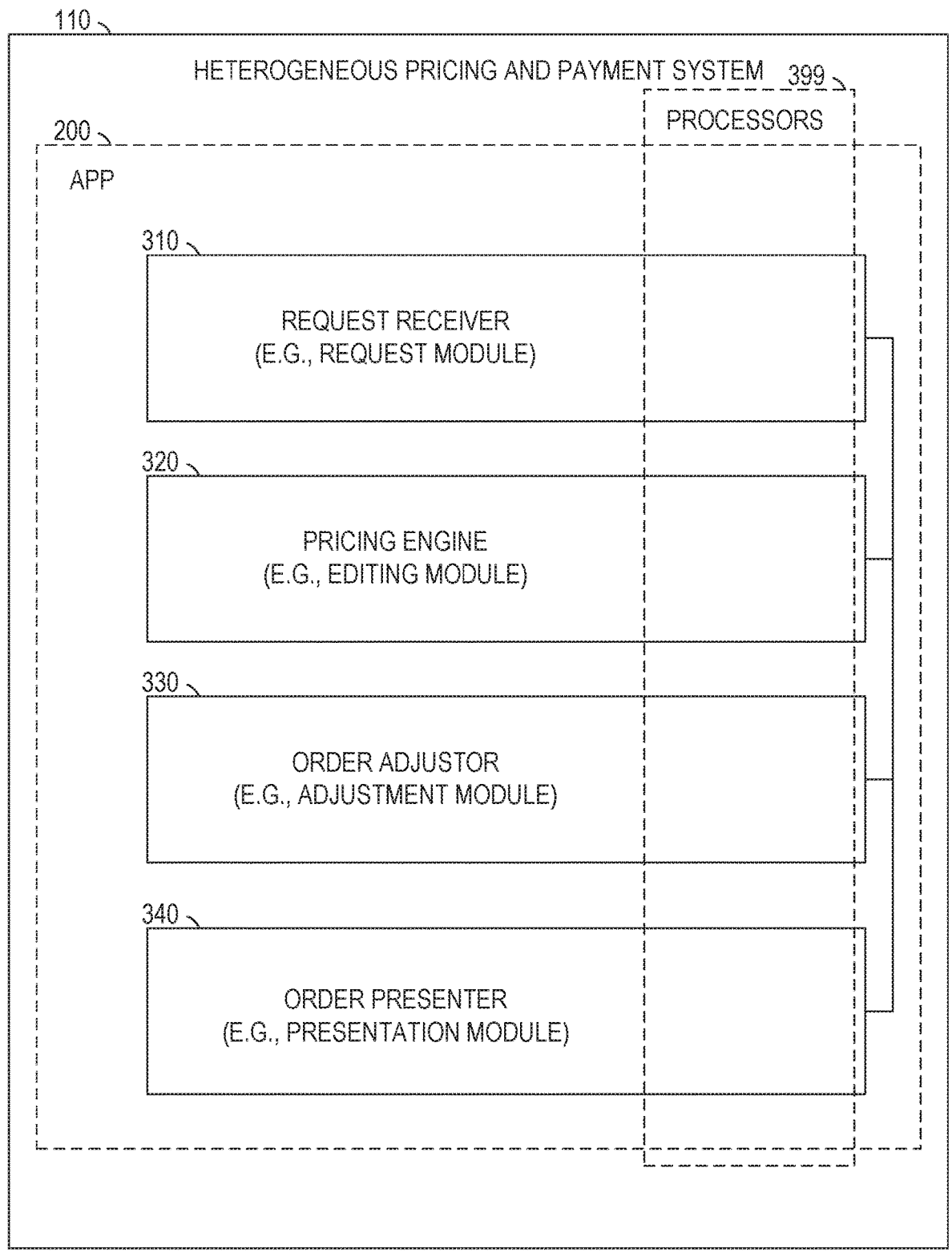
FIG. 3 is a block diagram illustrating components of a machine suitable for heterogeneous pricing and payment system, according to some example embodiments.

FIG. 3 is a block diagram illustrating components of the heterogeneous pricing and payment system 110, according to some example embodiments. The heterogeneous pricing and payment system 110 is shown as including a request receiver 310, an pricing engine 320, an order adjustor 330, and an order presenter 340, all configured to communicate with each other (e.g., via a bus, shared memory, or a switch).

As shown in FIG. 3, the request receiver 310 and the pricing engine 320 may form all or part of an app 300 (e.g., a mobile app) that is stored (e.g., installed) on the heterogeneous pricing and payment system 110 (e.g., responsive to or otherwise as a result of data being received from the client device 130 via the network 190). Furthermore, one or more processors 399 (e.g., hardware processors, digital processors, or any suitable combination thereof) may be included (e.g., temporarily or permanently) in the app 300, the request receiver 310, the pricing engine 320, the order adjustor 330, the order presenter 340, or any suitable combination thereof.

Any one or more of the components (e.g., modules) described herein may be implemented using hardware alone (e.g., one or more of the processors 399) or a combination of hardware and software. For example, any component described herein may physically include an arrangement of one or more of the processors 399 (e.g., a subset of or among the processors 399) configured to perform the operations described herein for that component. As another example, any component described herein may include software, hardware, or both, that configure an arrangement of one or more of the processors 399 to perform the operations described herein for that component. Accordingly, different components described herein may include and configure different arrangements of the processors 399 at different points in time or a single arrangement of the processors 399 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 4:
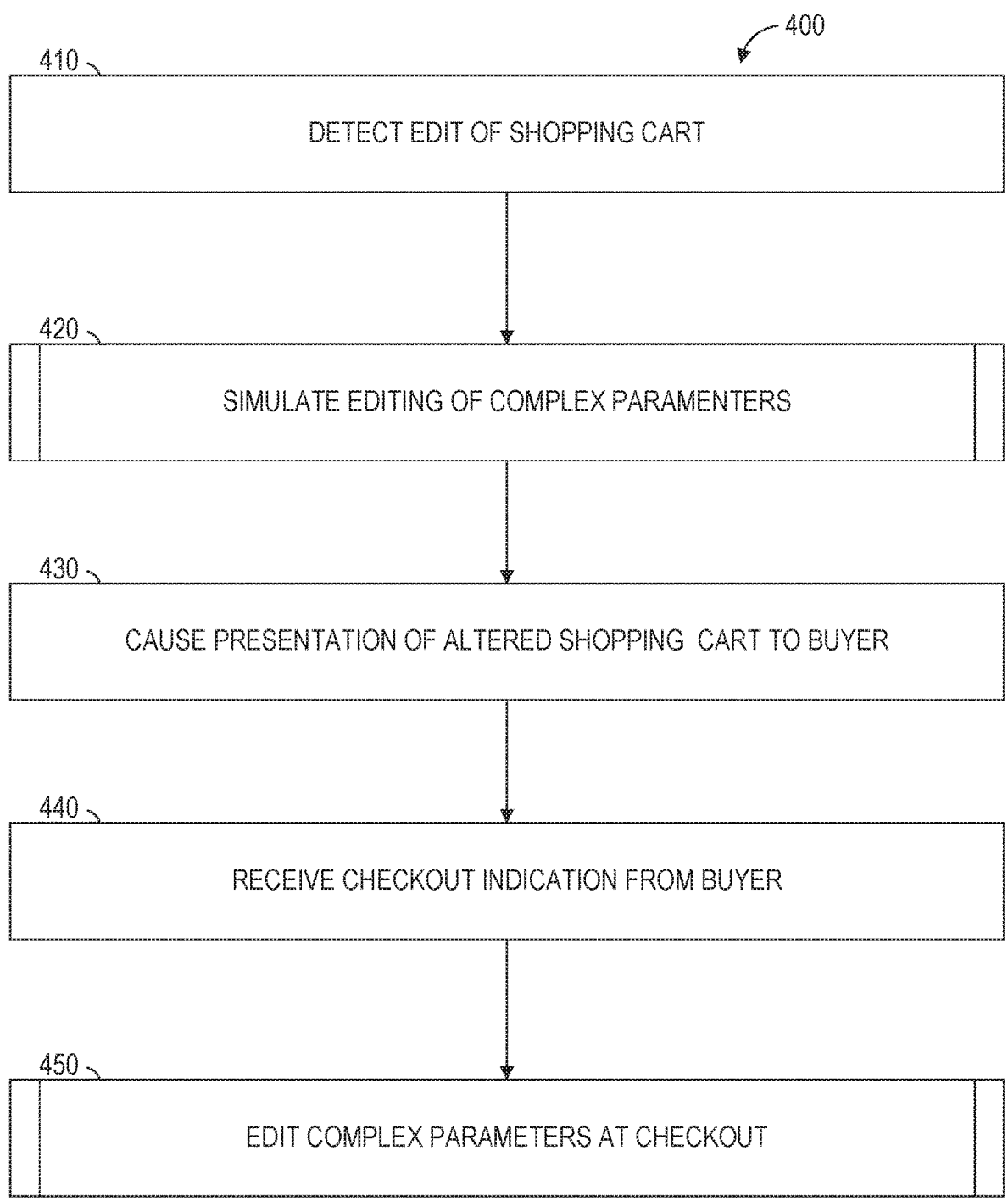
FIG. 4-8 are flowcharts illustrating operations of a device in performing a method of heterogeneous pricing and payment, according to some example embodiments.

FIGS. 4-8 are flowcharts illustrating operations of the heterogeneous pricing and payment system 110 in performing a method 400 of heterogeneous pricing and payment, according to some example embodiments. Operations in the method 400 may be performed by the heterogeneous pricing and payment system 110, using components (e.g., modules) described above with respect to FIG. 3, using one or more processors (e.g., microprocessors or other hardware processors), or using any suitable combination thereof. As shown in FIG. 4, the method 400 includes operations 410, 420, 430, 440, 450.

In operation 410, the request receiver 310, detects an edit to the shopping cart. An edit to the shopping cart may include the buyer 232 adding an item to the shopping cart, the buyer 232 removing an item from the shopping cart, or the availability of an item in the shopping cart (such as price and quantity available) changing, or any other modification to the shopping cart that is considered significant enough to cause a recalculation of item totals in the shopping cart.

In operation 420, the pricing engine 320 conducts a complex parameter editing simulation of the order by accessing information from the database(s) 126. This includes accessing product details from the product database 215, buyer preferences from the buyer database 216, or seller preferences from the seller database 217. The pricing engine 320 can further access other databases such as a currency database or discount database to adjust complex parameters such as currency type or a discount to the order. The pricing engine 320 determines whether an adjustment to a complex parameter is needed by comparing buyer preferences associated with the item within the buyer database 216 and seller preferences associated with the item within the seller database 217 and assessing if the preferences correlate with each other (such as a buyer offering payment in dollars and a seller accepting payment in dollars). If the buyer preferences correlate with the seller preferences, an adjustment to complex parameters associate with the preferences is not necessary.

The pricing engine 320 further determines whether an adjustment to a complex parameter is needed by accessing database(s) 126 and comparing the total value of the shopping cart (cart total) or the total value of the items within the shopping cart ordered from a particular seller (order total) with threshold values within the database(s) 126. If the order or cart total transgresses a threshold value, the pricing engine 320 determines that an adjustment is needed. The pricing engine 320 further determines whether an adjustment to a complex parameter is needed by accessing database(s) 126 and determining whether an item characteristic within one of the databases correlates to the complex parameter, the item characteristic indicating that a correlated complex parameter needs to be adjusted. The pricing engine 320 further provides functionality to calculate the adjustment to the complex parameter needed, such as by communicating with a logic module such as a currency calculator or discount calculator. Also, the simulated checkout further occurs automatically without buyer 232 input, and the specific steps of the operations are not viewable by the buyer 232. In some embodiments, after all of the adjustments are calculated, the order adjustor 330 aggregates the adjustments to the shopping cart and determines and overall total to present the buyer 232.

When the buyer 232 edits the shopping cart, such as by adding the item, the price of the item may change based on the buyer preferences not matching the seller preferences. In an example, the currency offered by the buyer 232 may not match the currency required by the seller according to the buyer and seller preferences. In other words, the buyer preference located on the buyer database 116 includes a preference that the buyer 232 only pays in a certain currency. Thus, the purchase may need a currency exchange transaction and the pricing engine 320 simulates the currency exchange, simulates any fees associated with the exchange, calculates an adjustment to the currency parameter, and adjusts the currency parameter in response to the exchange rate and associate fees.

In another example, the pricing engine 320 adjusts a discount complex parameter that applies discounts to items in the shopping cart. Similarly, the pricing engine 320 can adjust complex parameters associated with the tax that is applied or complex parameters associated with shipping costs by simulating the checkout of an edited shopping cart.

In operation 430, the order presenter 340 presents an item total as generated by the order adjustor 330. For example title and price are displayed on a shopping cart screen that is shown in a user interface such as graphic user interface 134 and is part of the client device 130. In operation 440, the request receiver 310 receives an indication from the buyer 232, such as the buyer 232 interacting with the graphic user interface 134. The request receiver further detects that the interaction it has received from the buyer 232 is an indication to check out the shopping cart. In operation 450, responsive to detecting the checkout of the shopping cart, the request receiver 310 initiates a checkout of the shopping cart.

Figure 5:
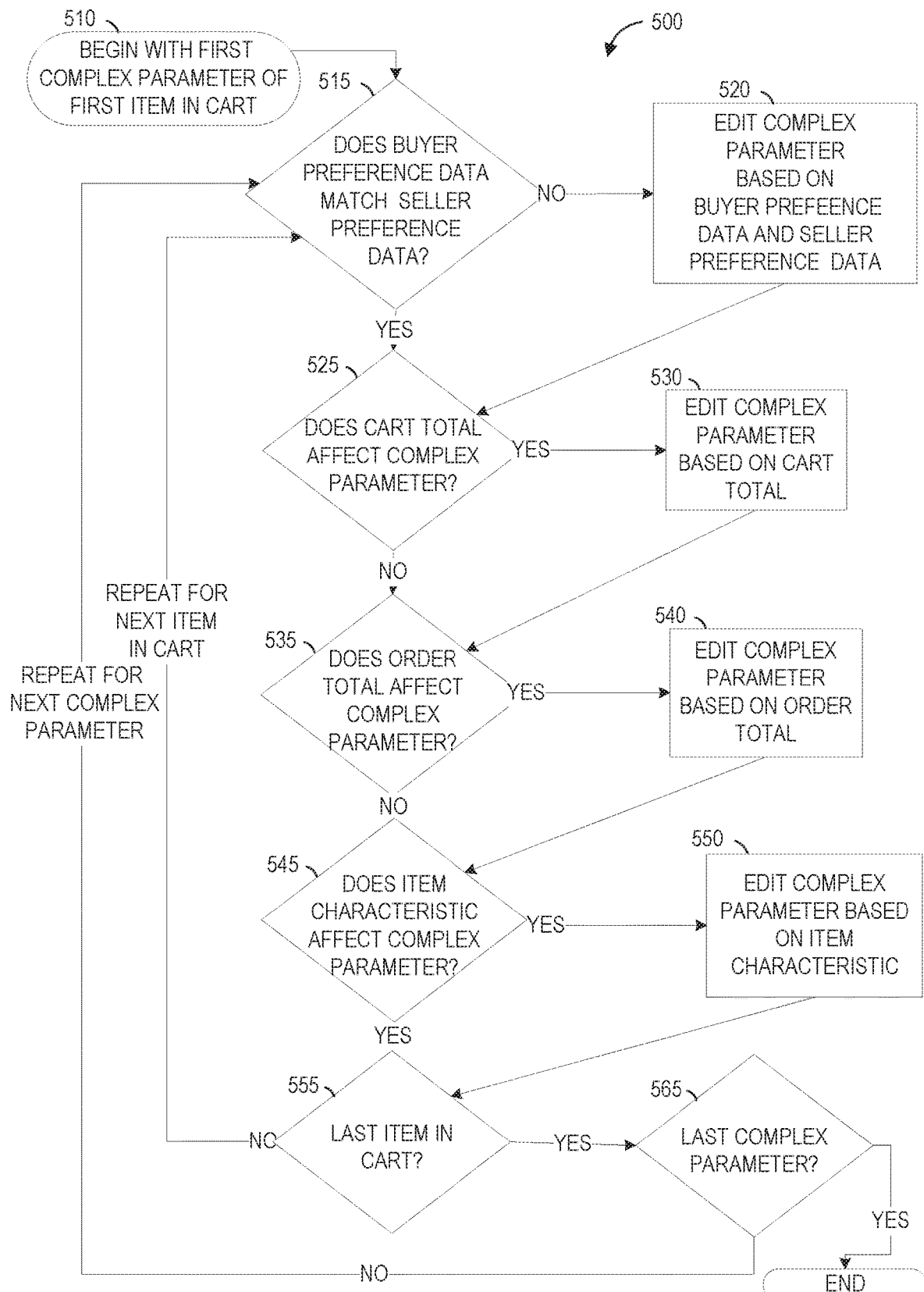

In some embodiments, method 400 includes further sub operations of operation 420 and 450, such as operations 510-555, in FIG. 5 as method 500. When operations 510-555 are sub-operations of 420, the editing of complex parameters for items in the shopping cart are simulated. When operations 510-555 are sub-operations of 450, the complex parameters for each item are actually edited at checkout rather than in the shopping cart setting. Thus, sub-operations 510-555 may apply differently since some complex parameters may occur or be subject to editing at either operation 420, operation 450, or at both operations.

In operation 510, the pricing engine 320 begins simulating the order starting with the first complex parameter of the first item. As described above, complex parameters are item attributes that apply to the item depending on how the cart is edited. As described above, a complex parameter is an attribute of a possible transaction of an item that is subject to change based on the context of the possible transaction. Examples of complex parameters include the currency that is used to purchase the item, a level of discount that applies to the item, a cost of shipping an item, or a sales tax applied to the item.

In operation 515, the pricing engine 320 accesses buyer preference data (buyer preferences) corresponding to the complex parameter and retrieved from the buyer database 216 and seller preference data (seller preferences) corresponding to the complex parameter and contained in the seller database 217. In operation 515 the pricing engine 320 compares the buyer preferences retrieved from the buyer database 216 to the seller preferences retrieved from the seller database 217 and determines if the preferences match. A match occurs if fulfilling the order according to a buyer preference would also satisfy a seller preference. For example, if the buyer preferences establish that the buyer 232 will only pay in a first currency and the seller preferences establish that the seller will only pay in a second currency, the preferences do not match. In some example embodiments, buyers and sellers may establish multiple preferences per complex parameter if they desire, and in such cases the preferences will considered to be matching if any of the buyer preferences for the complex parameter match any of the seller preferences for the complex parameter. For example, if a buyer indicates a preference to pay in dollars or euros and a seller indicates a preference to receive payment in Rubles or dollars then a match has occurred (dollars).

Figure 6:
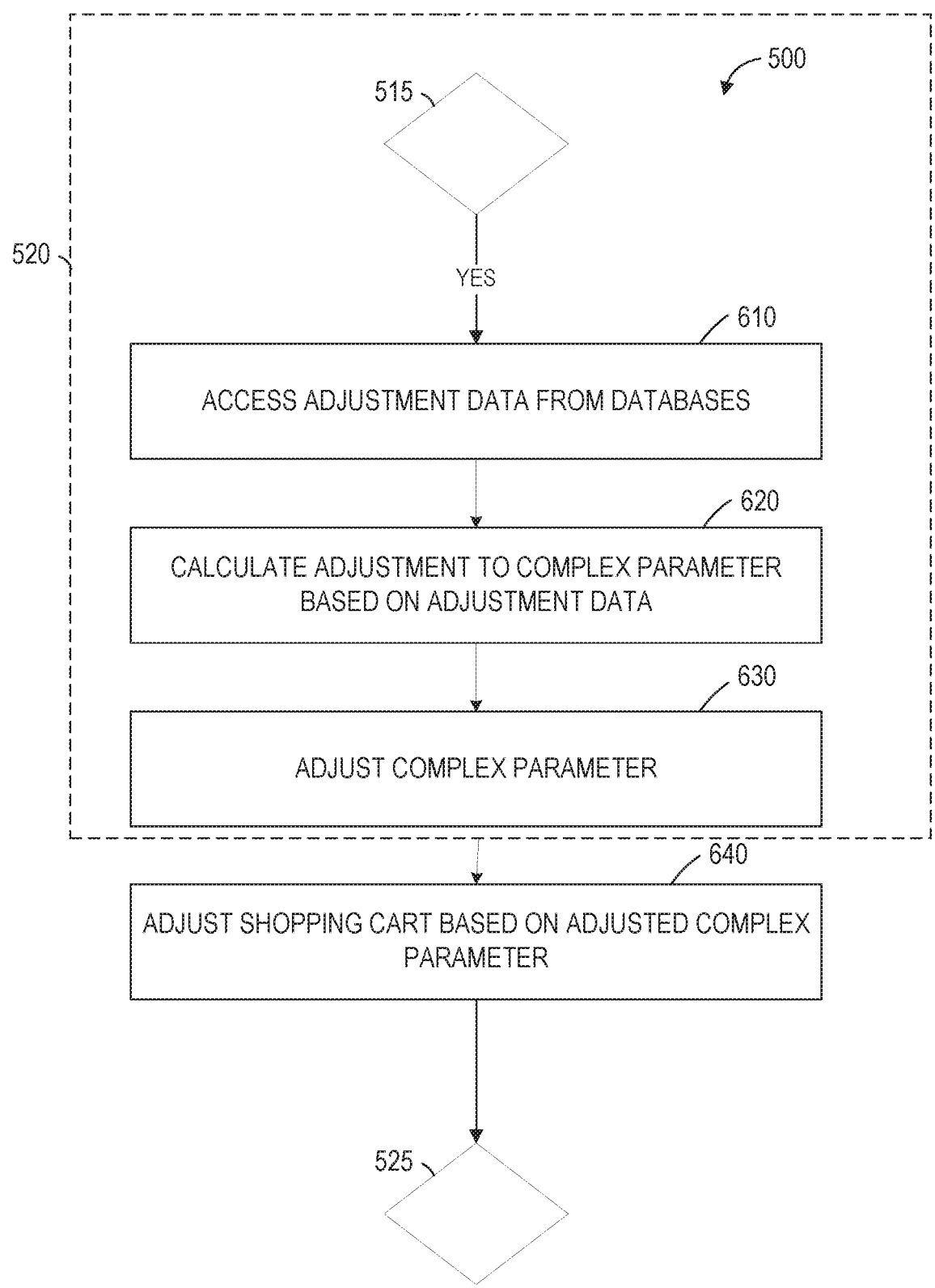

In operation 520, sub operations occur that are represented by sub operations 610-640 in FIG. 6. In sub operation 610, the pricing engine 320, responsive to the buyer preference data not matching the seller preference data, accesses adjustment data from one or more of the database(s) 126. For example, the pricing engine 320 may access currency data from a currency database if the complex parameter of currency in the buyer preferences do not match the seller preferences. In sub operation 620, the pricing engine 320 calculates the adjustment to the complex parameter in order to match the seller preference. For example, the pricing engine 320 can receive currency data to determine how much of the first currency is needed to compensate the seller in the second currency. In sub operation 630, the pricing engine 320 adjusts the complex parameter to match the seller's preference. In the currency example, this would include adjusting the amount of the buyer currency to a quantity that is needed to fulfill the seller's currency requirement. In operation 640, the pricing engine 320, in conjunction with the order adjustor 330, adjusts the shopping cart to reflect the adjusted buyer complex parameter. In the currency example, the order adjustor 330 would increase the total price of the shopping cart based on how much more of the buyer's 232 currency is needed to satisfy the price for the item in the seller's currency.

At operation 525, the pricing engine 320 determines if the total price of the cart may affect a complex parameter. Specifically, where the complex parameter is the price of the item, the pricing engine 320 determines if the price of the entire shopping cart causes the price of the item to increase or decrease (such as where a discount is applied to an item based on the total of the entire shopping cart, e.g. 10% off all items if shopping cart total is greater than $100).

Figure 7:
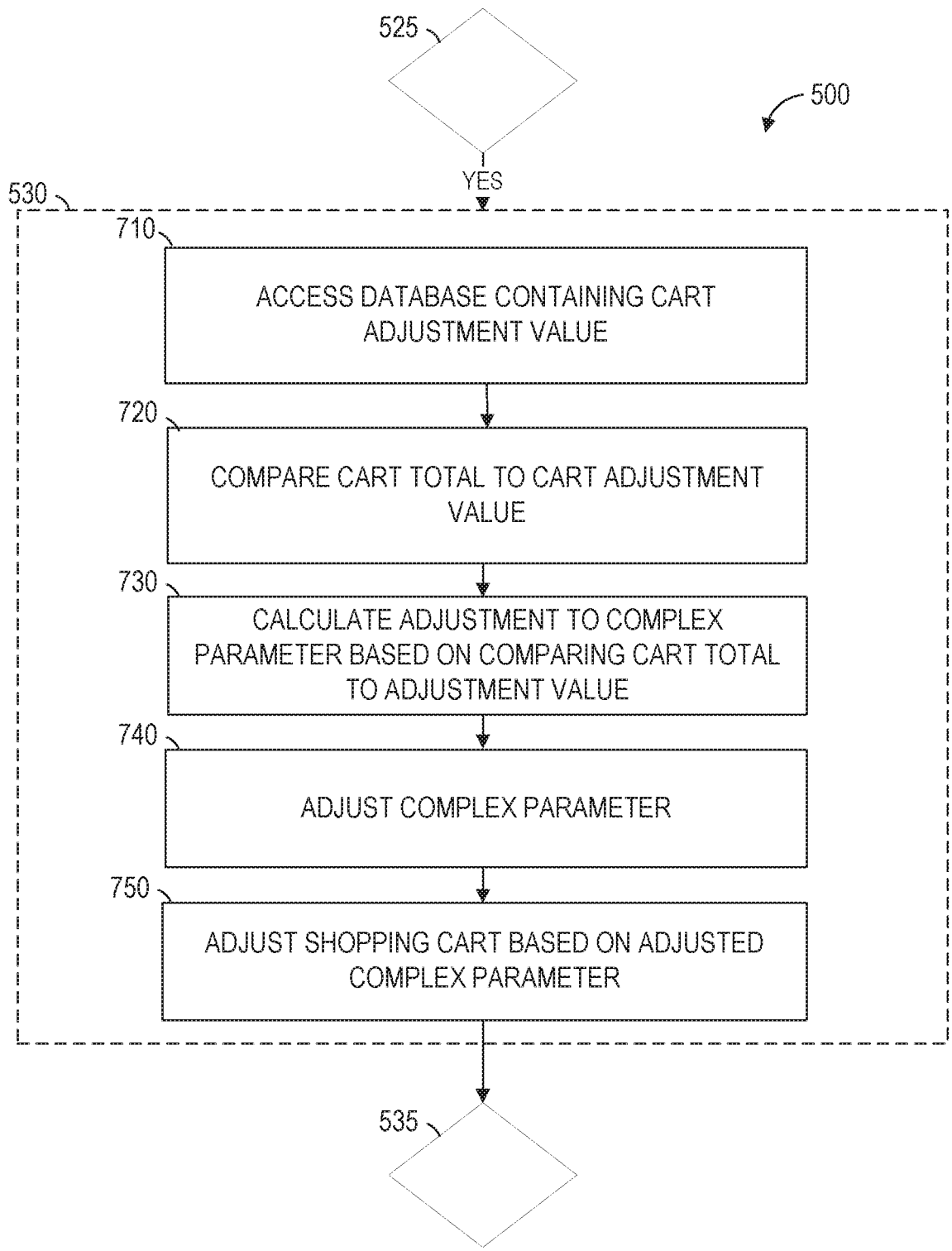
Figure 8:
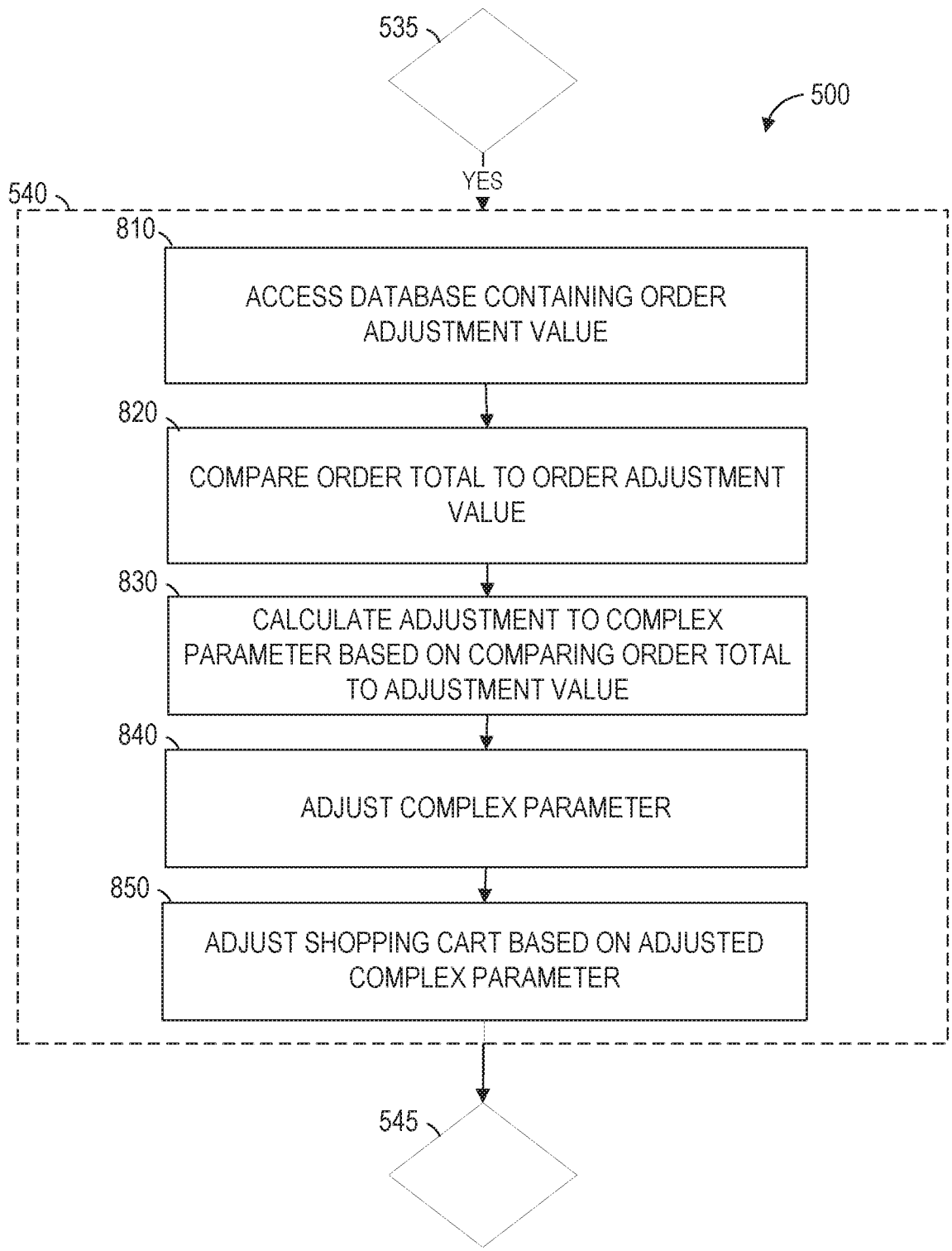

Similar to above, sub operations 710-750 shown in FIG. 7 describe sub operations of operation 530. In sub operation 710, responsive to the total price of the shopping cart potentially affecting the complex parameter, the pricing engine 320 accesses a database containing information that designates how the cart total should affect the complex parameter, such as an adjustment value that the cart total must reach. For example, the pricing engine 320 accesses data that indicates a discount should be applied to all shopping carts exceeding a specified adjustment value. In operation 720, the cart total is compared to the adjustment value. In operation 730, the pricing engine 320 calculates an adjustment to the complex parameter based on the comparison. For example, the pricing engine 320 may calculate that the price of the item should decrease by 10% based on the cart total, so the complex parameter for the item price is adjusted to half of the original price. In operations 740 and 750, the pricing engine 320 adjusts the complex parameter based on the calculated adjustment and the order adjustor 330 adjusts the shopping cart based on the adjusted complex parameter.

At operation 535, the pricing engine 320 similarly determines if the total of all items ordered from a particular seller affects a complex parameter. This similar to operation 525 where the cart total affects the complex parameter, but limited to only items in the cart that are ordered from a seller. Similar to operation 530, operation 540 includes sub operations 810-850, shown in FIG. 8, that describe accessing an order adjustment value from a database, such as the seller database 217, comparing the order adjustment value to the order total, calculating an adjustment value, and adjusting the complex parameter and shopping cart. For example, if a seller offered a discount for ordering a threshold quantity of items at the same time from the seller, the pricing engine 320 would decrease the price of at least one of the items responsive to the threshold quantity being exceeded.

At operation 545, the pricing engine 320 determines if any item characteristics affects a complex parameter. An item characteristic is located within the data of an item listing and is an instruction that an item be processed a certain way. For example, an item characteristic may designate a discount and that the discount only applies to only that item. In another example, an item characteristic designates that sale of the item includes free shipping. In still another example, the item characteristic designates sales tax does not apply to the item given where the buyer 232 is located. Then item characteristics may be accessed within the database(s) 126 including the product database 215 and the seller database 217.

In operation 550, responsive to determining that at least one item characteristic affect a complex parameter, the pricing engine 320 calculates an adjustment to the complex parameter and adjusts the complex parameter based on the item characteristic. Similar to operations above, the pricing engine 320 accesses adjustment data within the database(s) 126, the adjustment data including item characteristics such as a discount on the item. Next the pricing engine 320 calculates an adjustment, such as calculating a level of discount to an item, and adjusts the complex parameter, such as adjusting the discount level of the item in the shopping cart to the level calculated from the discount in the adjustment data. Next, similar to previous diagrams, the order adjustor 330 edits the shopping cart to reflect the adjustment.

At operation 555, the pricing engine 320 determines if the item that is associated with the complex parameter being adjusted is the last item in the shopping cart. For example, if the currency parameter applies to a second item after the pricing engine 320 and the order adjustor 330 have made adjustments to the currency parameter and the shopping cart, the pricing engine 320 returns to operation 515 and repeats the method 500 for the second item.

At operation 565, responsive to the item being the last item that the complex parameter applies to, the pricing engine 320 determines if there are any other complex parameters that apply to the order. For example, after the pricing engine 320 has adjusted the currency complex parameter based on data from the database(s) 126 related to all of the items the currency complex parameter applies to, the pricing engine 320 may start operation 515 over again using the discount complex parameter. If the item is the last item complex parameters apply to, the method 500 ends.

In an alternative example embodiment, method 500 can be employed to determine a level of refund where only part of the previous shopping cart checkout is returned. For the return, the request receiver 310 detects that at least one item in the cart has been returned. The pricing engine 320 accesses the original shopping cart that was checked out from the database(s), such as the buyer database 216. Using the same operations within method 500, the pricing engine 320 adjusts complex parameters based on the edited shopping cart. In this way, the pricing engine can unwind the operations that occurred at the original checkout that included the returned item and rewind the operations into a new checkout without the returned item.

In particular, the cart total will be different in the new checkout, and the pricing engine 320 may need to edit at least one complex parameter at operation 540. Additionally, the order total from the seller of the returned item will also be different, and the pricing engine 320 may similarly need to edit at least one complex parameter. In response to the adjustments the order adjustor 330 can further calculate the return by subtracting the adjusted cart total determined at the return from the original cart total. The order presenter 340 can further present the return, receive an indication from the buyer 232 to "checkout" (confirm) the return, and initiate the checkout of the return.

For example a 10% off discount applying to cart totals over $100 is no longer met when an item is returned by the buyer 232. The request receiver 310 detects the return and treats it as if it is an edit to the original shopping cart. The pricing engine 320 determines that the discount complex parameter is affected by the new cart total, calculates an adjustment to the discount complex parameter, and adjusts the discount parameter. Due to the loss of the "over $100" discount, the discount complex parameter for each item in the cart is now 0% instead of 10%. The order adjuster 330 then subtracts the adjusted cart total from the original cart total, the original cart total having a 10% off discount applied to every item and including the returned item and the adjusted cart total having no discount applied but not including the returned item. The difference between the original cart total and the adjusted cart total, if a positive value, represents the value returnable to the buyer 232.

In addition to order total and cart total, the pricing engine 320 may adjust according to other criteria. Complex parameters such as discount level or shipping cost may have been applied by the pricing engine 320 based on the number of items ordered. For example, a seller has a scaled discount for multiple items purchased in an order, such that the first item is not discounted, the second item is discounted 5%, the third item is discounted 10%, the fourth item is discounted 15%, and the fifth item as well as any more items are each discounted 20%. Responsive to the buyer 232 previously checking out five items and returning the third item purchased in the original order, the pricing engine 320 re-simulates the order using the four remaining items. For the new checkout, the first item still has no discount, the second item still has a discount of 5%, the fourth item now has a discount of 10%, and the fifth item has a discount of 15%. After the pricing engine 320 calculates these adjustments, the order adjustor 330 assess a return to the buyer 232 based on the difference between the original checkout that includes four discounts on five items and the new checkout that includes three discounts on four items.

In another example, the pricing engine 320 includes an operation that applies a different payment method to the cart, adding an additional sub-operation to sub-operations 510-565. If the different payment method affects the complex parameter at the new sub-operation, the pricing engine 320 can accordingly edit the complex parameter. This effect can be presented in an example embodiment of a buyer 323 purchasing a luxury watch with a currency that does not match the seller's preference data in that the buyer's currency is designated as US Dollars and the seller's currency is designated as Swiss Francs. The buyer 323 may additionally place a repair kit from the seller in the cart along with an alternative watch strap from a US seller in the cart. If paying entirely in dollars, the currency complex parameters for the watch and the repair kit would be edited during the checkout phase, since the watch and the repair kit require a currency transaction of dollars to francs (the alternate strap would not, since the US seller would likely take dollars). However, the buyer 232 may use a specific "money transfer" payment method for the high-priced watch in order to avoid the currency fee. Thus, at checkout, the watch would not require an edit to the currency complex parameter since the payment method has changed, the repair kit would require an edit to the currency complex parameter in order to compensate the seller in francs, and the alternate strap would not require an edit to the currency complex parameter since the seller of the strap will accept dollars. Therefore, sub-operation 520 would only apply to the repair kit. The transactions can be completed simultaneously, such that it appears to be one checkout transaction to the buyer 232.

Figure 9:
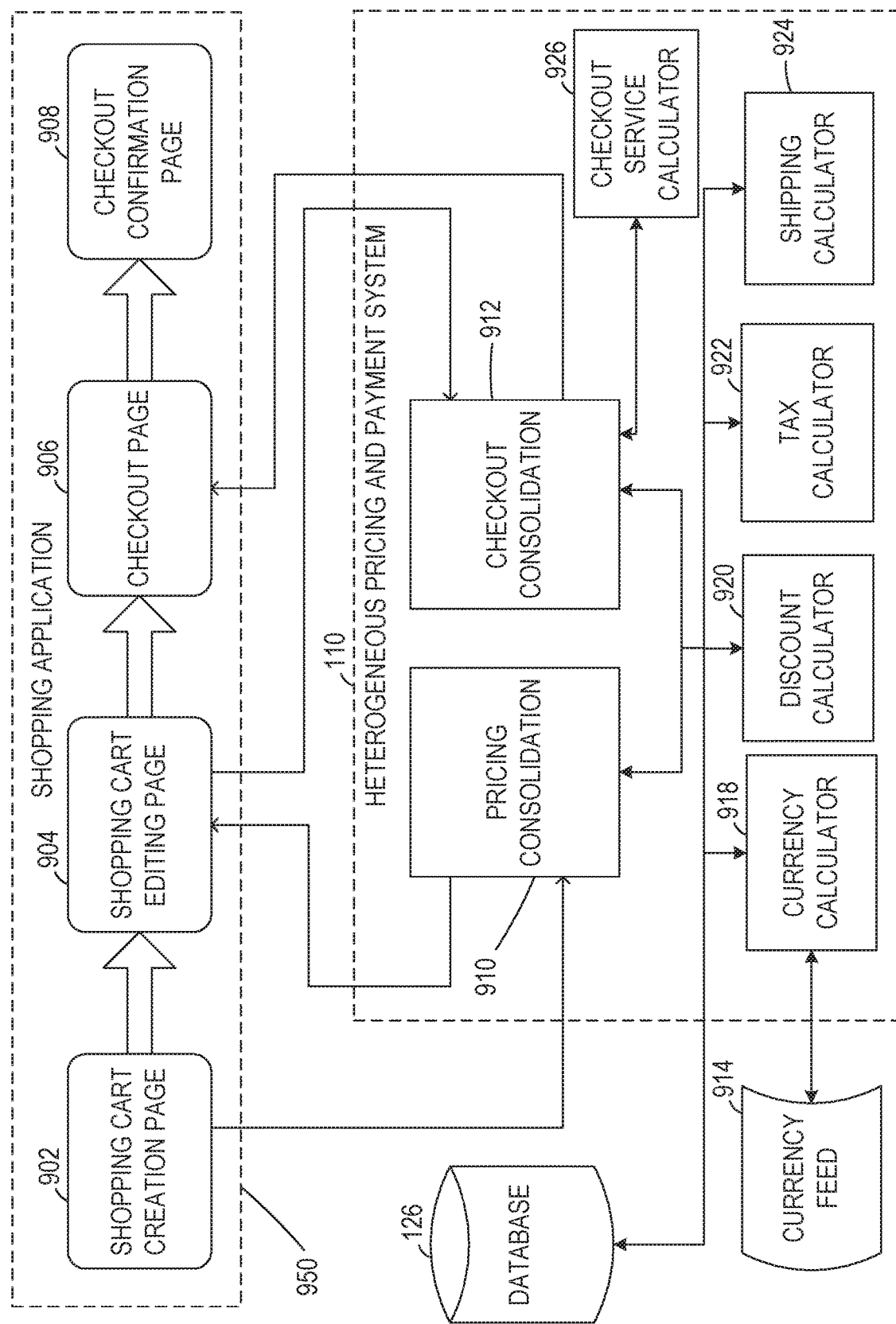
FIG. 9 is a network flowchart illustrating a shopping application interacting with the heterogeneous pricing and payment system, according to some example embodiments.

FIG. 9 is a network flowchart illustrating an example embodiment of the heterogeneous pricing and payment system, in the example, a shopping application 950 that is presented to the buyer 232. According to some example embodiments, the buyer 232 views four types of interactive pages on the graphic user interface 134 of the client device 130 during the purchase process. The first type of page is the shopping cart creation page 902, which comprises any page where the buyer 232 is able to add items to the shopping cart. The shopping cart creation page 902 could therefore comprise any page where the buyer 232 selects an item to add to the shopping cart. The shopping cart creation page 902 communicates with the heterogeneous pricing and payment system 110, and the request receiver 310 receives the request for the item. During a pricing consolidation phase 910, the pricing engine 320 accesses various logic modules, such as a currency calculator 918 to adjust the currency complex parameter by determining a difference in buyer currency due to a necessary currency transaction and receive currency data from a currency feed 914; a discount calculator 920 to determine any discount that may apply to an item; a tax calculator 922 to calculate the any tax that will be applied to an item; and a shipping calculator 924 to calculate the cost of shipping an item. These logic modules, along with the pricing engine 320, access one or more database(s) 126, which may include the product database 215, the buyer database 216, the seller database 217, a discount database, a shipping database, or various other databases.

After the pricing engine 320 conducts the complex parameter editing simulation, the order adjustor 330 generates a modified item price. The order presenter 340 then presents the modified item price, in this instance, on a shopping cart editing page 904. On the shopping cart editing page 904 the buyer 232 can view all items that he or she has selected along with the modified price of each item. A buyer 232 can further modify the shopping cart on the shopping cart editing page 904 by deleting one or more items.

Responsive to a buyer 232 taking a checkout action, such as selecting "checkout" on the shopping cart editing page 904 or another page, the buyer 232 is directed to a checkout page 906 within the shopping application 950. The checkout page 906 displays item titles as well as the checkout price for each item. The checkout price is generated by the pricing engine 320 may simulate similar order transactions in a checkout consolidation phase 912. This phase may additionally include simulations that first occur at checkout rather than in the shopping cart. For example, a checkout service calculator 926 determines an item price adjustment needed for the purchase, such as determining a secure transaction fee. Based on the transactions occurring in the checkout consolidation phase 912, the order adjustor 330 determines a price adjustment to each item price and generates a checkout price for each item. In an example embodiment, the shipping cost is not previously simulated or calculated until the buyer 232 reaches the checkout consolidation phase 912.

After the checkout consolidation phase 912, the order presenter 340 then presents the checkout price for an item along with the item title on the checkout page 906. After reviewing the checkout page 906, the buyer 232 can decide to confirm the order and proceed to a checkout confirmation page 908.

In an example embodiment, the machine-implemented operations include a consolidated currency calculation. The consolidated currency calculation may be implemented by the pricing engine 320 communicating with the currency calculator 918 and the currency feed 914 over the network 190. The pricing engine 320 determines whether a currency exchange needs to take place, and the expenses, if any, associate with the currency exchange.

In example embodiments, the currency calculator 918 may engage in communications with a currency feed 914 over the network-based system 102, the currency feed 914 including various exchange rates. The currency feed 914 may access data from one or more currency databases, the data containing information about currency exchange rates. The currency feed 914 may regularly replace old data containing information about the currency exchange rate with new data in order to reflect current exchange rates.

In some example embodiments, the currency calculator 918 also determines whether an exchange fee applies to currency exchange. The exchange fee may be calculated on a contingent basis, where the fee is a percentage of the amount of funds to be exchanged. The exchange fee may also be a flat fee that the pricing engine 320 levies on a per-transaction basis.

In some example embodiments, the pricing engine 320 may further make alterations or make suggestions to the buyer 232's payment method in order to reduce one or more exchange fees or other fees. For example, if a first payment method requires a security fee or a transaction fee associated with the transaction and a second payment method does not require the fee, the pricing engine 320 can automatically prompt the buyer 232 to select the first payment method. In alternative example embodiments, this prompt may occur at the checkout consolidation phase 912, in order to allow the buyer 232 to continue shopping without regard to payment during the pricing consolidation phase 910.

In an example, a Russian seller offers lacquer boxes for sale internationally, but prefers to be paid in Russian Rubles. An american buyer 232 would like to purchase a lacquer box, but prefers to pay in US Dollars. The pricing engine 320 determines that a currency exchange is needed to satisfy the buyer 232 and the seller. The pricing engine 320 then accesses a currency feed 714 to determine the current exchange rate of US Dollars and Russian Rubles. In this example, the exchange rate is 65 Rubles to the dollar and the lacquer box is priced at 1500 Rubles. The pricing engine 320 thus determines that $23.08 is needed from the buyer 232 to satisfy the seller. In addition, the pricing engine 320 determines that a 3% fee is required to exchange the $23.08 for 1500 Rubles. Thus, roughly $0.70 is added to bring the total price reflected to the buyer 232 to $23.78 for the lacquer box. Additionally, the shopping cart may include an option for the buyer 232 to pay 1500 Rubles if the buyer 232 would prefer to avoid the exchange fee.

In another example, a US buyer 232 is purchasing two lacquer boxes, a first lacquer box from a first seller and a second lacquer box from a second seller, both sellers located in Russia. The first seller has specified that he will accept either Russian Rubles or US Dollars and the second seller has specified that he will only accept Rubles. The buyer 232 has a credit of 1000 Rubles from another exchange as well as dollars available as payment. Within the cart, the pricing engine 320 applies the credit Rubles to the second lacquer box first because dollars can be applied to the first seller, reducing the currency exchange fee.

In a further embodiment, the currency calculator 918 can later provide a refund to the buyer 232 in the buyer 232's preferred currency if the order is not satisfied or the buyer 232 returns the item. In this embodiment, the currency calculator 918 accesses the currency feed 914 to determine how much of the paid currency is needed to satisfy the buyer 232 in the buyer 232's preferred currency.

Continuing an above example, if the 1500 Ruble lacquer box never arrives, the buyer 232 would require a $23.78 refund, since this is the exact amount paid. The seller would be required to pay the 1500 Rubles in addition to the cost of the initial exchange of dollars to Rubles and the subsequently required exchange of Rubles to dollars.

In example embodiments, the machine-implemented operations include a consolidated discount calculation. The consolidated discount calculation may be implemented by the discount calculator 920. As part of the complex parameter editing simulation, the discount calculator 920 determines whether a discount or coupon applies to the order and, responsive to a discount or coupon applying, calculating a discounted price of the item.

In some example embodiments, the pricing engine 320 may engage in communications with a database 126 that is a discount database over the network 190 as part of the complex parameter simulation, the discount database including one or more discount values. The discount database may contain one or more discount values that apply a discount when the pricing engine compares the cart total or the order total. For example, the pricing engine 320 may apply a discount to an overall order if the order total transgresses an order discount value. In another example embodiment, the pricing engine 320 may apply a discount if a threshold number of items are included in the order. In another example embodiment, the pricing engine 320 may void a previously applied discount if the buyer 232 has taken action to adjust the virtual shopping cart such that the threshold is no longer transgressed.

In the lacquer box example, the seller advertises, "spend 4000 Rubles or more and receive 20% off your order." Responsive to the buyer 232 adding a 5000 Ruble lacquer box to the virtual shopping cart, the pricing engine 320 accesses at least one discount database to assess if a discount applies. One of the discount databases contains a threshold assigned to the seller, set at 4000 Rubles, and correlated with a 20% discount. The discount calculator 920 determines that the 4000 Ruble threshold is transgressed for this seller and the order adjustor 330 adjusts the price of the lacquer box reflected to the buyer 232 in the shopping cart down from 5000 Rubles to 4000 Rubles.

In an alternative example embodiment, the lacquer box seller advertises, "buy three lacquer boxes, get the fourth free." Responsive to the buyer 232 adding four lacquer boxes to the virtual shopping cart, the pricing engine 320 accesses at least one database 126 that is a discount database as part of the complex parameter editing simulation. The discount database contains a threshold assigned to the seller, set at three lacquer boxes, and correlated with a free lacquer box. The discount calculator 920 determines that the threshold is transgressed and communicates with the pricing engine 320. The order adjuster 330 adjusts the price of one of the lacquer boxes reflected to the buyer 232 in the shopping cart to zero.

In some example embodiments, the pricing engine 320 may further engage in communications with a coupon database over the network-based system 102 to apply a discount to the order, the coupon database including one or more coupons assigned to the buyer 232. In an example, the database 126 is a coupon database that includes instructions to assign a coupon to the buyer 232. In some example embodiments, the coupon database may assign a coupon to the buyer 232 based on a prior buyer 232 action, such as the buyer 232 inputting a coupon code prior to selecting items. In other embodiments, the coupon database may assign a coupon to the buyer 232 based on a certain event, such as a sale day or the buyer 232's tenth transaction in purchasing the same product.

In the lacquer box example, the seller may offer a 50% discount to buyer 232s that are purchasing their fifth lacquer box. Responsive to the buyer 232 adding a lacquer box to the virtual shopping cart after previously purchasing four other lacquer boxes, the pricing engine 320 accesses at least one discount database as part of the complex parameter editing simulation. One of the discount databases includes a coupon, the coupon including a buyer 232 indicator that matches the buyer 232. The pricing engine 320 can match the buyer 232 indicator for the 50% off coupon to the buyer 232 and apply the coupon to the shopping cart. The shopping cart will therefore reflect the "50% off price" rather than the original price for the lacquer box.

In example embodiments, the machine-implemented operations include a security service. The security assessment may be implemented by a security service that provides safeguards in a sales contract to ensure that all parties to the sales contract fulfill the agreed-upon terms of the contract. In some embodiments, the security assessor can determine the necessity and applicability of the security service to the order as part of a complex parameter editing simulation. Responsive to an indication from the security service that the security service cannot validate the order, the security assessor can remove the item from the buyer's 232 cart.

Figure 10:
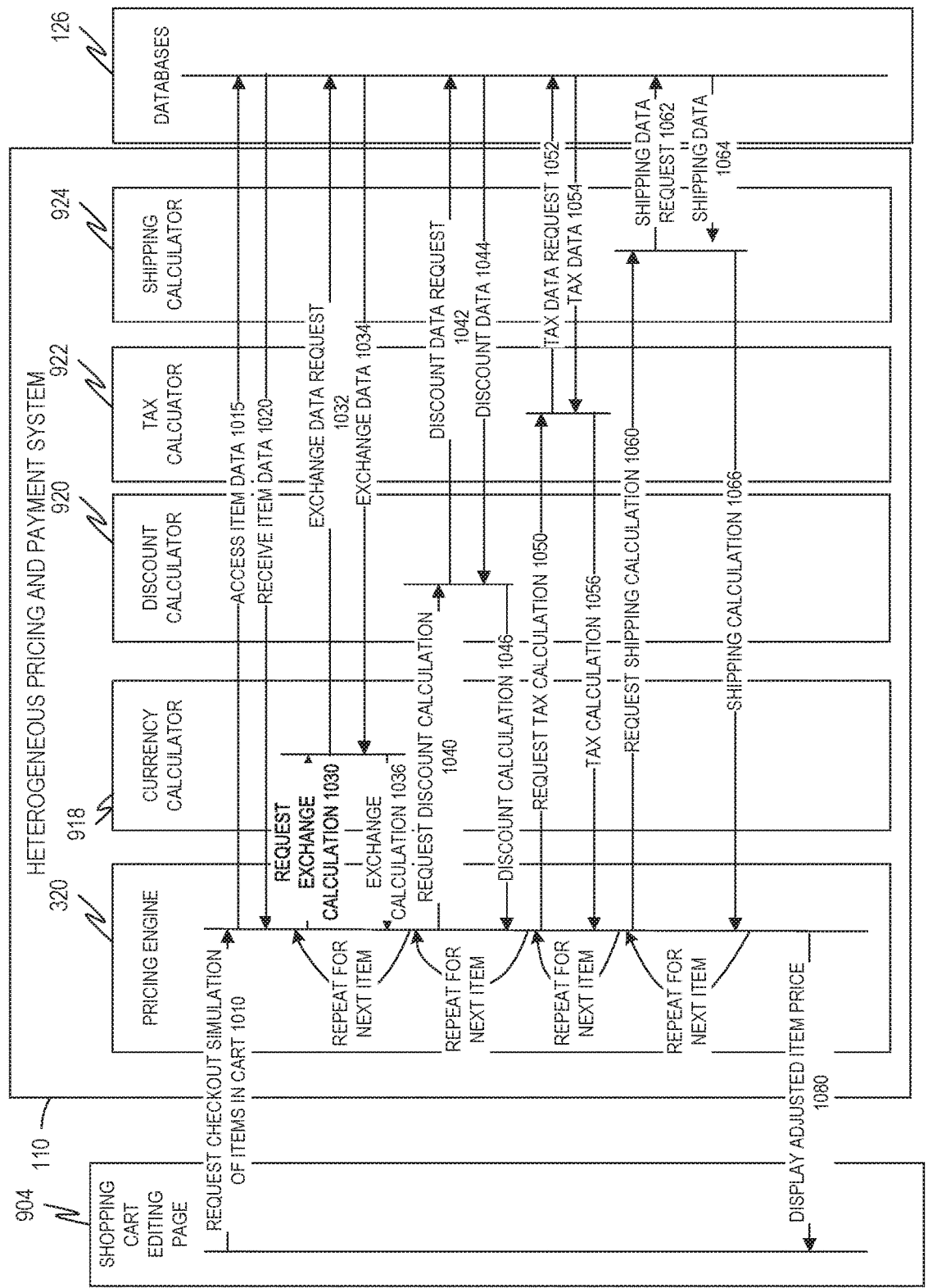
FIG. 10 is an interaction diagram showing the interactions between components of the heterogeneous pricing and payment system, according to some example embodiments.

FIG. 10 is an interaction diagram further showing an example of the specific interactions involved in operation 420 as applied to the system of FIG. 9. Specifically, the diagram shows the interaction between the shopping cart editing page 904, the logic modules contained included in the heterogeneous pricing and payment system 110, and various database(s) 126 accessed by the hardware modules. As shown by the diagram, the shopping cart editing page 904 only changes once to display the approximate pricing based on complex parameter simulations at interaction 1080 during the entire example of involved in operation 420. FIG. 10 may similarly apply to operation 450 where complex parameters are edited during checkout and using the checkout page 906 to display the final price to fulfill the order.

Applying the example of the buyer 232 purchasing a single lacquer box, the diagram 1000 shows the shopping cart editing page 904 initiating the order simulation by communicating with the pricing engine 320 at interaction 1010. The pricing engine 320 then communicates, at interaction 1015, with one or more databases 126, such as the product database 215 or seller database 217, to access and receive (interaction 1020) item data, such as the listed price, location, seller, and currency requested for the lacquer box. The pricing engine 320 then simulates a currency exchange (interaction 1030) by communicating with the currency calculator 918. The currency calculator 918 then requests currency exchange data at interaction 1032 and receives the data at interaction 1034 from a currency database included in databases 126. The order simulator 320 uses the data to make a calculation of the exchange requirements (interaction 1036) based on the currency data. Similarly, in interactions 1040-1044, the pricing engine 320 communicates with a discount database included in the databases 126 to access and receive discount data, such as a coupon for the lacquer box. The pricing engine 320 then runs a discount calculation using the discount calculator 920 at interaction 1046 to determine the effect of the discount on the item data. Interactions 1050-1056 and 1060-1066 similarly conduct a tax calculation and a shipping calculation respectively for the lacquer box based on data received from a tax database and a shipping database included in the databases 126. After all of the simulations are complete, the pricing engine 320 calculates and overall price adjustment to apply to the item price based on the calculations. The pricing engine 320 then changes the user interface, in interaction 1080, to display the adjusted item price on the shopping cart editing page 904.

In an example embodiment, the pricing engine 320 additionally engages in similar operations to operations 1000-1080 during the checkout consolidation phase 912. This can include repeating operations 1000-1080 for each item that is to be purchased at checkout to generate an approximation of the total cost of checking out each item when taking into account currency conversion, tax, shipping, etc.

Additionally, in response to a successful completion of operations 1000-1080, the order adjuster 320 may further engage in operations including fixating the item to the sale, such that it will not be subject to other transactions. The order adjustor 320 may further communicate instructions record the sale of the item as to decrement the inventory of the item, and communicate to the buyer 232 through a display that the sale has succeeded, such as through the checkout confirmation page 908.

At any one of the steps 1000-1080 during the pricing consolidation 910 or the checkout consolidation 920 phase, a failure may occur within one of the operations that will require a cancellation of the sale. In this case, the pricing engine 320 can employ a similar operation described previously for returns and "unwind" the sale to reverse previously completed parts of the transaction.

Figure 11:
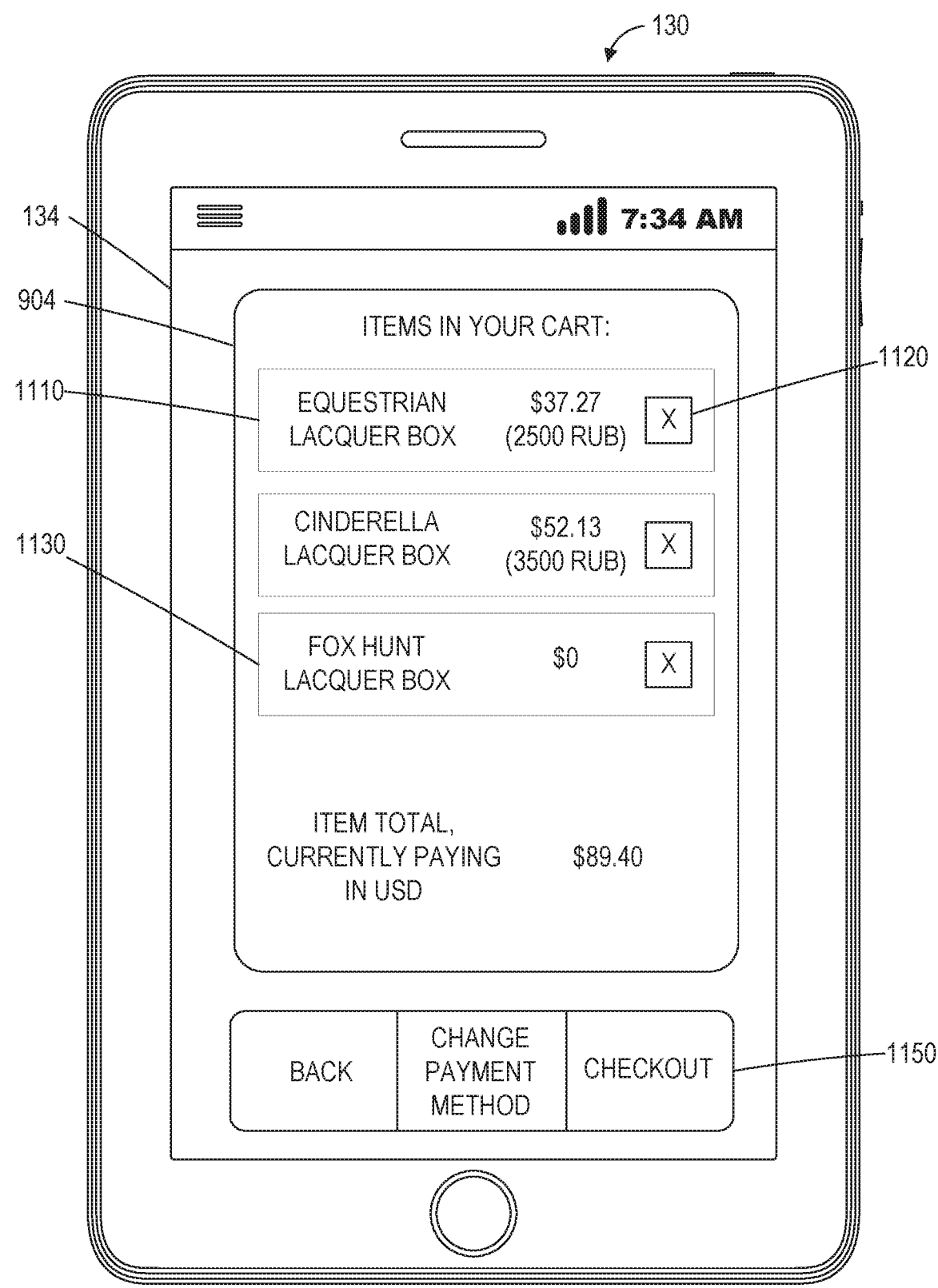
FIG. 11 is an example illustration of a client device displaying a shopping cart interface to a buyer, the shopping cart interface containing prices modified by seller price adjustments.

FIG. 11 is an example illustration of a client device 130 displaying a shopping cart interface to a buyer 232, the shopping cart interface containing prices modified by seller price adjustments. The illustration includes the client device 130 displaying information on the graphic user interface 134. Further, the shopping cart editing page 904 is displayed on the graphic user interface 134. In the illustration, a product window 1110 is displayed and contains an item title reading "Equestrian Lacquer Box" and a modified item price of $37.27. Additionally, a price in the seller currency is shown at 2500 Rubles. The price in Rubles is actually worth less according to the currency feed, but the modified item price takes into account a 3% transaction fee. Also included on the product window 1110 is a delete button 1120, which allows the buyer 232 to edit the cart by deleting the item. Another item 1130, the "Fox Hunt Lacquer Box," has a modified item price of $0, because the heterogeneous pricing and payment system 110 has applied a discount to the item 1130, the discount reading "buy 2 lacquer boxes, get 1 free." Should the buyer 232 delete one of the other items, the heterogeneous pricing and payment system 110 would void the coupon and display the modified price for the item 1130, taking into account the item price and any price adjustment determined by simulated transactions. Also included is an interactive bar 1150 including various user options, such as a "checkout" option to proceed to the checkout page 906.

In an alternative example embodiment, the price in Rubles for the lacquer boxes may be displayed in the product window 1110 as sub-totals that reflect the price of the boxes before currency conversion. The display can further detail the fee, in this case, the 3% fee in Rubles, or alternatively, in dollars, that will be added to each sub-total during the currency conversion. In a further alternative example embodiment, the buyer 232 may be provided with an additional button that allows the buyer 232 to checkout immediately from the shopping cart editing page 904.

Figure 12:
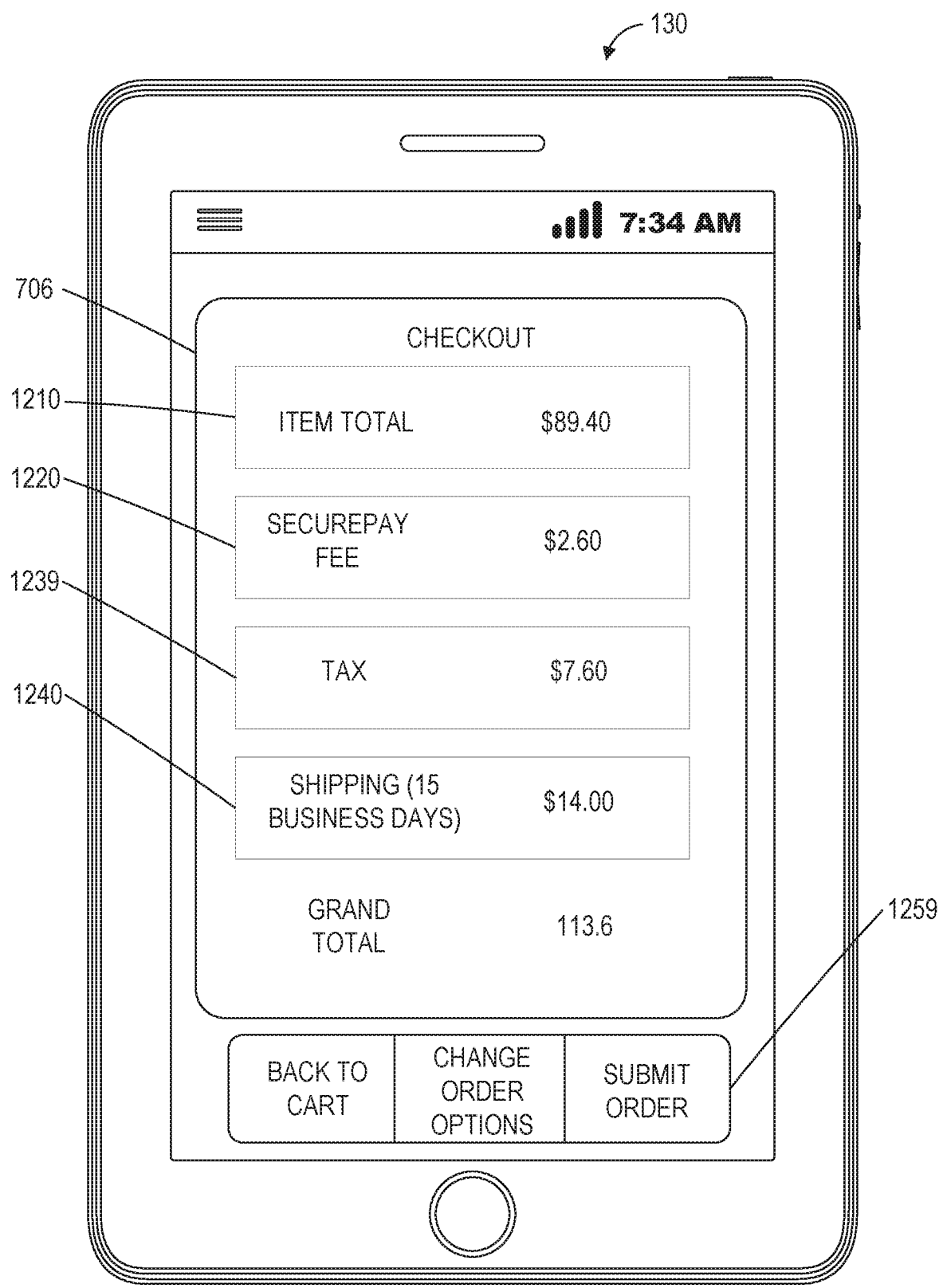
FIG. 12 is an example illustration of the client device displaying a checkout interface to a buyer, the checkout interface containing prices modified by seller price adjustments.

FIG. 12 is an example illustration of the client device 130 displaying an example checkout interface to a buyer 232, the checkout interface containing prices modified by seller price adjustments. Similar to FIG. 11, the client device 130 displays the checkout page 906 on the graphic user interface 134. Within the checkout page 906, an item total window 1210, security fee window 1220, tax window 1239, and shipping window 1240 are displayed. Additionally, the options on the interactive bar 1150 have changed and now allow the buyer 232 to submit the order.

In an alternative example embodiment, the client device 130 may display the product window 1110 to the buyer 232, the product window 1110 containing a list of the items to be purchased, similar to FIG. 11. This list may further be detailed currency fees, tax fees, shipping fees, and other transaction fees that are incurred through the purchase of items in the cart.

After the buyer 232 submits the order, the client device 130 may present the checkout confirmation page 908 with an interface that details the items purchased, similar to FIG. 11. In the event that the order fails due to an error in any transaction, the system can unwind the transaction as described above and display a cancellation or error notice on the checkout confirmation page 908.

Example Machine Architecture and Machine-Readable Medium

Figure 13:
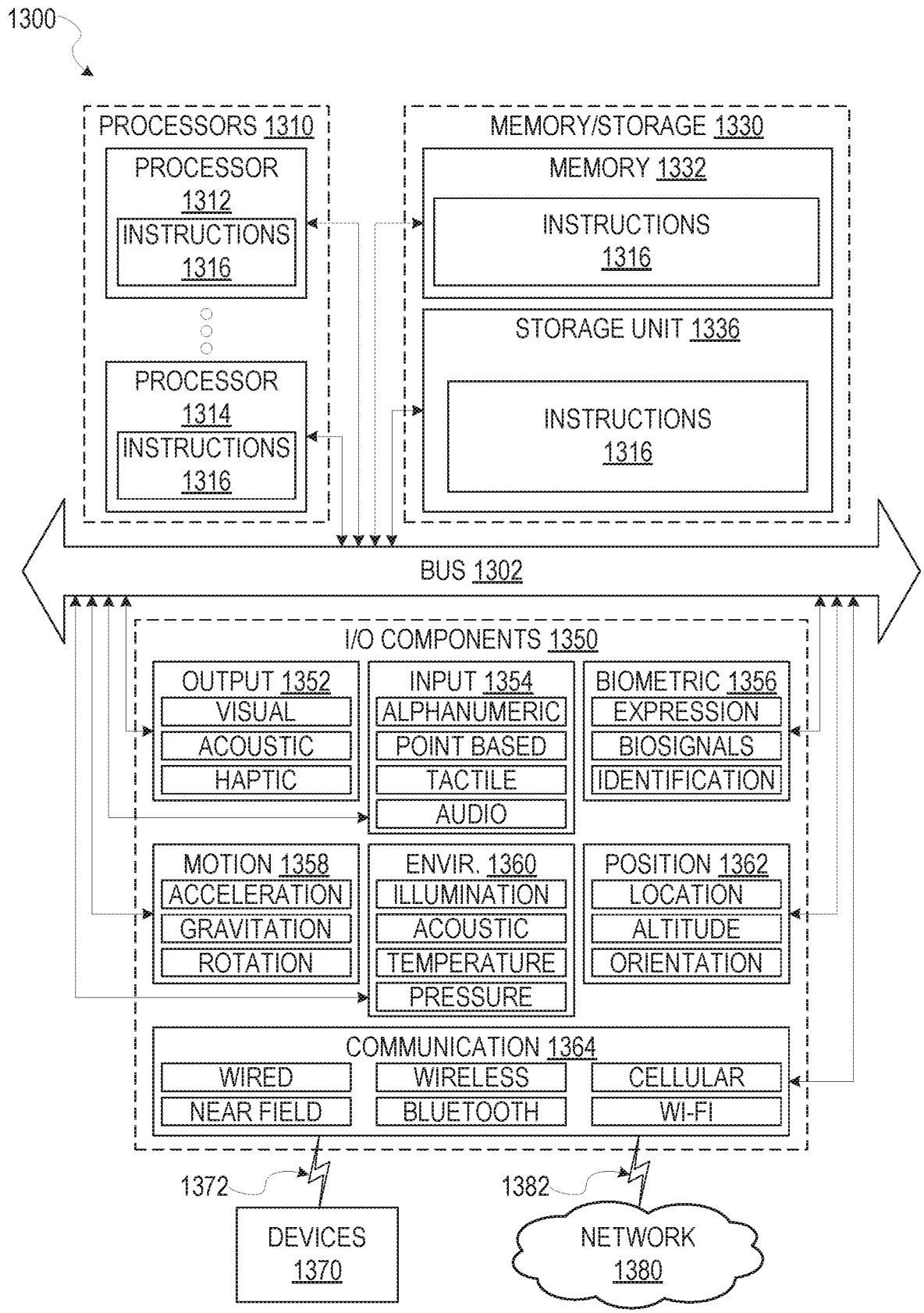
FIG. 13 is a block diagram illustrating components of a machine, according to some example embodiments, able to read instructions from a machine-readable medium and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example the instructions 1316 may cause the machine 1300 to execute the flow diagrams of FIGS. 4-8. Additionally, or alternatively, the instructions 1316 may implement request receiver 310, order simulator 320, order adjustor 330, and order presenter 340 of FIG. 3, and so forth. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory/storage 1330, and I/O components 1350, which may be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1312 and processor 1314 that may execute instructions 1316. The term "processor" is intended to include multi-core processor that may comprise two or more independent processors (sometimes referred to as "cores") that may execute instructions 1316 contemporaneously. Although FIG. 13 shows multiple processors 1310, the machine 1300 may include a single processor with a single core, a single processor with multiple cores (e.g., a multi-core process), multiple processors with a single core, multiple processors with multiples cores, or any combination thereof.

The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor's cache memory), or any suitable combination thereof, during execution thereof by the machine 1300. Accordingly, the memory 1332, the storage unit 1336, and the memory of processors 1310 are examples of machine-readable media.

As used herein, "machine-readable medium" means a device able to store instructions (e.g., instructions 1316) and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1350 may include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environmental components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person voice identification, retinal identification, facial identification, fingerprint identification, or electroencephalogram based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via coupling 1382 and coupling 1372 respectively. For example, the communication components 1364 may include a network interface component or other suitable device to interface with the network 1380. In further examples, communication components 1364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a Universal Serial Bus (USB)).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as location via Internet Protocol (IP) geo-location, location via Wi-Fi® signal triangulation, location via detecting a NFC beacon signal that may indicate a particular location, and so forth.
Transmission Medium In various example embodiments, one or more portions of the network 1380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or other type of cellular or wireless coupling. In this example, the coupling 1382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to devices 1370. The term "transmission medium" shall be taken to include any intangible medium that is capable of storing, encoding, or carrying instructions 1316 for execution by the machine 1300, and includes digital or analog communications signals or other intangible medium to facilitate communication of such software.
Language Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled. As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
one or more hardware processors; and
a memory storing instructions that configure the one or more hardware processors to perform operations comprising:
detecting an edit to a shopping cart user interface comprising a plurality of items in different currency formats, the edit being made by a client device and pertaining to a first item of the plurality of items with a first currency value that is in a first currency format and a second item with a second currency value that is in a different second currency format;
in response to the edit:

suppressing updates to the shopping cart user interface while simulating checkout adjustments for the first and second items in the shopping cart user interface, including, for each of the first and second items:
  accessing the corresponding currency format for the respective item from at least one seller user database,
  accessing a dynamic exchange value from a network feed for the corresponding currency format for the respective item, and
  generating an adjusted currency value in the corresponding currency format for the respective item using the dynamic exchange value;
while continuing to suppress updates to the shopping cart user interface, generating a combined data value for a single checkout session by combining the adjusted currency values associated with each of the first and second items;
updating the shopping cart user interface to display the combined data value; and
causing, on the client device, presentation of a checkout user interface that includes the combined data value of the single checkout session.

2. The system of claim 1, the operations further comprising:
receiving, from the client device, selection of a checkout user interface element in the shopping cart user interface; and
in response to receiving the selection of the checkout user interface element, re-simulating the checkout adjustments for each of the first and second items based on an update to the dynamic exchange value from the network feed, the shopping cart user interface and the checkout user interface displaying different values for the combined data value due to the updates.

3. The system of claim 1, the operations further comprising:
accessing, within a currency database, a currency exchange fee data associate with the dynamic exchange value for the first and second currency formats, wherein the adjustment value includes the currency exchange fee data.

4. The system of claim 1, wherein simulating the checkout adjustments further includes:
accessing a database that contains a cart adjustment value;
comparing the cart adjustment value to a cart total, the cart total being a price of all items included in the shopping cart user interface; and
calculating an adjustment to the combined data value based on a comparison of the cart adjustment value to the cart total.

5. The system of claim 1, wherein simulating the checkout adjustments further includes:
accessing a database that contains an order adjustment value;
comparing the order adjustment value to an order total, the order total being a price of all items included in the shopping cart user interface that are ordered from a same seller; and
calculating an adjustment to the combined data value based on a comparison of the order adjustment value to the order total.

6. The system of claim 1, wherein simulating the checkout adjustments further includes:
accessing a database that contains item characteristic adjustment data and comprising:
calculating an adjustment to the combined data value based on the item characteristic adjustment data.

7. The system of claim 6, wherein the item characteristic adjustment data includes a shipping value based on a geographic location.

8. A method comprising:
detecting an edit to a shopping cart user interface comprising a plurality of items in different currency formats, the edit being made by a client device and pertaining to a first item of the plurality of items with a first currency value that is in a first currency format and a second item with a second currency value that is in a different second currency format;
in response to the edit:
  suppressing updates to the shopping cart user interface while simulating checkout adjustments for the first and second items in the shopping cart user interface, including, for each of the first and second items:
    accessing the corresponding currency format for the respective item from at least one seller user database,
    accessing a dynamic exchange value from a network feed for the corresponding currency format for the respective item, and
    generating an adjusted currency value in the corresponding currency format for the respective item using the dynamic exchange value;
  while continuing to suppress updates to the shopping cart user interface, generating a combined data value for a single checkout session by combining the adjusted currency values associated with each of the first and second items;
  updating the shopping cart user interface to display the combined data value; and
  causing, on the client device, presentation of a checkout user interface that includes the combined data value of the single checkout session.

9. The method of claim 8, further comprising:
receiving, from the client device, selection of a checkout user interface element in the shopping cart user interface; and
in response to receiving the selection of the checkout user interface element, re-simulating the checkout adjustments for each of the first and second items based on an update to the dynamic exchange value from the network feed, the shopping cart user interface and the checkout user interface displaying different values for the combined data value due to the updates.

10. The method of claim 8, further comprising:
accessing, within a currency database, a currency exchange fee data associate with the dynamic exchange value for the first and second currency formats, wherein the adjustment value includes the currency exchange fee data.

11. The method of claim 8, wherein simulating the checkout adjustments further includes:
accessing a database that contains a cart adjustment value;
comparing the cart adjustment value to a cart total, the cart total being a price of all items included in the shopping cart user interface; and
calculating an adjustment to the combined data value based on a comparison of the cart adjustment value to the cart total.

12. The method of claim 8, wherein simulating the checkout adjustments further includes:
accessing a database that contains an order adjustment value;

comparing the order adjustment value to an order total, the order total being a price of all items included in the shopping cart user interface that are ordered from a same seller; and calculating an adjustment to the combined data value based on a comparison of the order adjustment value to the order total.

13. The method of claim 8, wherein simulating the checkout adjustments further includes:

accessing a database that contains item characteristic adjustment data and comprising:

calculating an adjustment to the combined data value based on the item characteristic adjustment data.

14. The method of claim 13, wherein the item characteristic adjustment data includes a shipping value based on a geographic location.

15. A non-transitory machine-readable storage medium comprising instructions that, when executed by one or more hardware processors of a machine, configure the machine to perform operations comprising:

detecting an edit to a shopping cart user interface comprising a plurality of items in different currency formats, the edit being made by a client device and pertaining to a first item of the plurality of items with a first currency value that is in a first currency format and a second item with a second currency value that is in a different second currency format;

in response to the edit:

suppressing updates to the shopping cart user interface while simulating checkout adjustments for the first and second items in the shopping cart user interface, including, for each of the first and second items:

accessing the corresponding currency format for the respective item from at least one seller user database, accessing a dynamic exchange value from a network feed for the corresponding currency format for the respective item, and generating an adjusted currency value in the corresponding currency format for the respective item using the dynamic exchange value;

while continuing to suppress updates to the shopping cart user interface, generating a combined data value for a single checkout session by combining the adjusted currency values associated with each of the first and second items;

updating the shopping cart user interface to display the combined data value; and causing, on the client device, presentation of a checkout user interface that includes the combined data value of the single checkout session.

16. The non-transitory machine-readable storage medium of claim 15, wherein the operations further comprise:

receiving, from the client device, selection of a checkout user interface element in the shopping cart user interface; and in response to receiving the selection of the checkout user interface element, re-simulating the checkout adjustments for each of the first and second items based on an update to the dynamic exchange value from the network feed, the shopping cart user interface and the checkout user interface displaying different values for the combined data value due to the update.

* * * * *